United States Patent
Kamimura et al.

(10) Patent No.: US 9,718,715 B2
(45) Date of Patent: Aug. 1, 2017

(54) WATER TREATMENT DEVICE

(75) Inventors: Kazuhide Kamimura, Kobe (JP); Hozumi Otozai, Kobe (JP); Kosuke Shigiishi, Kobe (JP); Hideo Suzuki, Tokyo (JP); Hiroshi Nakashoji, Tokyo (JP)

(73) Assignee: MITSUBISHI HITACHI POWER SYSTEMS ENVIRONMENTAL SOLUTIONS, LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/417,690

(22) PCT Filed: Aug. 3, 2012

(86) PCT No.: PCT/JP2012/069880
§ 371 (c)(1),
(2), (4) Date: Jan. 27, 2015

(87) PCT Pub. No.: WO2014/020762
PCT Pub. Date: Feb. 6, 2014

(65) Prior Publication Data
US 2015/0299016 A1 Oct. 22, 2015

(51) Int. Cl.
*C02F 1/46* (2006.01)
*C02F 9/00* (2006.01)
(Continued)

(52) U.S. Cl.
CPC ............... *C02F 9/00* (2013.01); *B01D 61/46* (2013.01); *B01J 49/70* (2017.01); *C02F 1/283* (2013.01);
(Continued)

(58) Field of Classification Search
CPC ...... C02F 1/4691; C02F 9/00; C02F 2201/46; C02F 3/00; C02F 1/283; C02F 1/76;
(Continued)

(56) References Cited

U.S. PATENT DOCUMENTS

2005/0056598 A1* 3/2005 Chowdhury ............ C02F 1/705
  210/757
2005/0252538 A1* 11/2005 Vernon ................... B82Y 30/00
  134/94.1

(Continued)

FOREIGN PATENT DOCUMENTS

CN  87205507 U  8/1988
CN  1396124 A   2/2003
(Continued)

OTHER PUBLICATIONS

PCT/ISA/210, "International Search Report for PCT/JP2012/069880".
(Continued)

*Primary Examiner* — Walter D Griffin
*Assistant Examiner* — Cameron Allen
(74) *Attorney, Agent, or Firm* — Manabu Kanesaka; Benjamin Hauptman; Kenneth Berner

(57) ABSTRACT

Provided is a water treatment device that suppresses the degradation of electrodes in a capacitive de-ionization treatment section and is capable of maintaining high water treatment capability. The water treatment device includes an activated carbon treatment section that receives an inflow of water having a total organic carbon concentration of 100 mg/l or less and adsorbs and removes organic matters contained in the water; and, on the downstream side of the activated carbon treatment section, a capacitive de-ionization treatment section including a pair of electrodes to which voltages having polarities opposite to each other are applied, a flow path, and ion exchange membranes. Ions contained in the water are adsorbed to the electrodes with voltages applied thereto, and voltages reverse to the voltages at the time of ions adsorption are applied to the electrodes to release the ions from the electrodes.

4 Claims, 4 Drawing Sheets

(51) Int. Cl.

| | | |
|---|---|---|
| *B01D 61/46* | (2006.01) | |
| *C02F 1/28* | (2006.01) | |
| *C02F 1/469* | (2006.01) | |
| *C02F 3/00* | (2006.01) | |
| *B01J 49/70* | (2017.01) | |
| *C02F 1/32* | (2006.01) | |
| *C02F 1/76* | (2006.01) | |
| *C02F 1/44* | (2006.01) | |
| *C02F 1/72* | (2006.01) | |
| *C02F 3/06* | (2006.01) | |
| *C02F 3/12* | (2006.01) | |
| *C02F 101/30* | (2006.01) | |

(52) U.S. Cl.
CPC .............. *C02F 1/4691* (2013.01); *C02F 1/72* (2013.01); *C02F 3/00* (2013.01); *C02F 1/32* (2013.01); *C02F 1/441* (2013.01); *C02F 1/722* (2013.01); *C02F 1/76* (2013.01); *C02F 3/06* (2013.01); *C02F 3/1268* (2013.01); *C02F 2101/30* (2013.01); *C02F 2201/46* (2013.01); *C02F 2209/20* (2013.01); *C02F 2303/22* (2013.01); *Y02W 10/15* (2015.05)

(58) Field of Classification Search
CPC .. C02F 2101/30; C02F 2303/22; C02F 1/441; C02F 1/722; C02F 3/06; C02F 3/1268; C02F 2209/20; C02F 1/32; C02F 1/46; Y02W 10/15
See application file for complete search history.

(56) References Cited

U.S. PATENT DOCUMENTS

| | | | |
|---|---|---|---|
| 2010/0230277 A1 | 9/2010 | Sullivan et al. | |
| 2013/0313191 A1* | 11/2013 | Wolf | C02F 9/00 210/638 |

FOREIGN PATENT DOCUMENTS

| | | | |
|---|---|---|---|
| CN | 2856037 Y | 1/2007 | |
| CN | 101434447 A | 5/2009 | |
| CN | 201825813 U | 5/2011 | |
| CN | 202152294 U | 2/2012 | |
| CN | 102442746 A | 5/2012 | |
| CN | 102627366 A | 8/2012 | |
| JP | H09-174048 A | 7/1997 | |
| JP | H11-319838 A | 11/1999 | |
| JP | 2001-070947 A | 3/2001 | |
| JP | 2001-87767 A | 4/2001 | |
| JP | 2003-088726 A | 3/2003 | |
| JP | 2004-33835 A | 2/2004 | |
| JP | 2011-083666 A | 4/2011 | |
| WO | WO 2011043604 A2 * | 4/2011 | ............ C02F 1/4691 |
| WO | 2012/091500 A1 | 7/2012 | |

OTHER PUBLICATIONS

PCT/ISA/237, "Written Opinion of the International Searching Authority for PCT/JP2012/069880".
China Patent Office, "Office Action for CN 201280074931.5," Aug. 26, 2015.
Song, Y. et al., "Water treatment Equipment Practical Handbook," China Petrochemical Press, Jul. 31, 2004, p. 255-260.
Japan Patent Office, "Decision of Patent Grant for Japanese Patent Application No. 2014-527928," Mar. 1, 2016.
China Patent Office, "Second Office Action for Chinese Patent Application No. 201280074931.5," Mar. 11, 2016.
Singapore Patent Office, "Office Action for Singaporean Patent Application No. 11201500167Q," Sep. 19, 2016.
Singapore Patent Office, "Third Office Action for Singaporean Patent Application No. 11201500167Q," Jun. 1, 2017.
Lee, L. Y. et al., "Ozone-biological activated carbon as a pretreatment process for reverse osmosis brine treatment and recovery," Water Research, Jun. 16, 2009, pp. 3948-3955, vol. 43, Elsevier Ltd.

* cited by examiner

WATER TREATMENT DEVICE

RELATED APPLICATIONS

The present application is National Phase of International Application No. PCT/JP2012/069880 filed Aug. 3, 2012.

TECHNICAL FIELD

The present invention relates to a water treatment device for performing a purification treatment on industrial waste water or water taken from a river, etc.

BACKGROUND ART

Industrial waste water from a plant or domestic waste water contains a large amount of organic matters, such as oils in the form of oil droplets or an emulsion and organic matters that are present in water in the form of ions or molecules. Industrial waste water containing organic matters is subjected to a purification treatment, such as the separation of oils and the decomposition and removal of organic matters by microorganisms. The treated water that has been subjected to a purification treatment is subjected to a demineralization treatment that removes ions contained in the waste water, and the treated water is reused as industrial water. In addition, organic matters are also contained in water in nature, such as rivers and lakes. Water taken from nature is also subjected to a purification treatment.

As demineralization treatment devices, reverse osmosis membrane demineralizers, capacitive de-ionization treatment devices (e.g., Patent Literature 1), and the like are known.

A reverse osmosis membrane demineralizer has a reverse osmosis membrane (RO membrane) inside. When water containing ions flows into a reverse osmosis membrane demineralizer flows, the reverse osmosis membrane (RO membrane) allows only water to permeate therethrough. The water that has permeated through the reverse osmosis membrane (treated water) is reused as industrial water, etc. On the upstream side of the reverse osmosis membrane, ions that were not allowed to pass through the reverse osmosis membrane are accumulated, and thus there is a concentrated water having concentrated ions. The concentrated water is discharged from the reverse osmosis membrane demineralizer, and thus discharged out of the system of the water treatment device 1.

In the case of a reverse osmosis membrane demineralizer, when the proportion of the treated water relative to the water flowing into the demineralizer is increased, the scale component concentration of the concentrated water becomes equal to or higher than the saturation solubility, resulting in the deposition of crystalline solids (scale). As substances that deposit as scale, calcium carbonate ($CaCO_3$), gypsum ($CaSO_4$), calcium fluoride ($CaF_2$), and the like are known. For example, when the concentration of calcium carbonate in water is 275 mg/l at pH 7.3, this exceeds the saturation solubility, and thus scale is deposited. However, scale deposition does not occur within a short period of time, such as 10 minutes, after the saturation solubility is exceeded, and scale deposition occurs after standing for a long period of time, such as one day. In a reverse osmosis membrane demineralizer, ion components are continuously removed by the membrane. Therefore, during operation with high water recovery, the ion concentration on the concentrated water side is constantly high, and a concentration equal to or higher than the saturation solubility is maintained for a long period of time (one day or more). Accordingly, scale is deposited on the concentrated water side in the reverse osmosis membrane demineralizer.

FIGS. 4(a) to 4(c) are schematic diagrams of a capacitive de-ionization treatment device. The capacitive de-ionization treatment device 100 is configured to include a positive electrode 101 and a negative electrode 102, which are a pair of opposed porous electrodes, and a flow path 103 that allows water to flow between the electrodes. An anion exchange membrane 104 is installed on the flow-path-side surface of the positive electrode 101, and a cation exchange membrane 105 is installed on the flow-path-side surface of the negative electrode 102.

A demineralization treatment by the capacitive de-ionization treatment device 100 is performed by the following steps.

(Demineralization Step)

First, electrodes are energized so that the positive electrode 101 is positively charged and the negative electrode 102 is negatively charged. That is, voltages having polarities opposite to each other are applied to the positive electrode 101 and the negative electrode 102, respectively. When water flows through the flow path 103 between the energized electrodes, negative ions in water permeate through the anion exchange membrane 104 and are adsorbed to a porous portion 101a of the positive electrode 101, while positive ions permeate through the cation exchange membrane 105 and are adsorbed to a porous portion 102a of the negative electrode 102 (FIG. 4(a)). The water from which ions have been removed is, as a treated water, provided for recycling, etc.

(Reproduction Step)

After the elapse of a predetermined period of time, the electrodes are energized so that the positive electrode 101 is negatively charged and the negative electrode 102 is positively charged. That is, voltages that are reverse to the voltages at the time of the adsorption of ions to the electrodes are applied to the positive electrode 101 and the negative electrode 102. As a result, the adsorbed ions are released from the positive electrode 101 and the negative electrode 102 and return to the flow path 103 (FIG. 4(b)).

After the released ions are sufficiently accumulated in the flow path 103 or at the same time as the release of ions, water is supplied to the flow path 103. Accordingly, water containing ions is discharged from the flow path 103, and the positive electrode 101 and the negative electrode 102 are regenerated to the state where no ions are adsorbed (FIG. 4(c)). The discharged water is recovered as a concentrated water.

Even if the saturation solubility is exceeded in the above regeneration step, when the regeneration step is performed within a short period of time, such as 10 minutes or less, the demineralization step starts before scale deposition, and the concentration becomes lower than the saturation solubility, whereby scale deposition is prevented. Because of this characteristic, a capacitive de-ionization treatment device can achieve higher water recovery (recovery of recyclable water) than a reverse osmosis membrane demineralizer and thus is more advantageous.

In order to increase the amount of ions adsorbed to electrodes in a capacitive de-ionization treatment device, larger electrode surfaces are more desirable. Therefore, a porous material made mainly of carbon having a large surface area per volume, such as activated carbon, is used for the electrodes.

CITATION LIST

Patent Literature

{PTL 1}
Japanese Unexamined Patent Application, Publication No. 2001-70947 (paragraphs {0002} and {0011} and FIG. 1)

SUMMARY OF INVENTION

Technical Problem

As mentioned above, it has been revealed that in the case where water that has been subjected to oil separation or a treatment with microorganisms is treated in a capacitive de-ionization treatment device, the demineralization performance is rapidly degraded with time. Such degradation is hardly seen in a reverse osmosis membrane demineralizer.

An object of the present invention is to provide a water treatment device that suppresses the degradation of electrodes in a capacitive de-ionization treatment device and is capable of maintaining high water treatment capability.

Solution to Problem

The present inventors have thought that the cause of the degradation of demineralization performance is as follows: even with the water quality that can be achieved by ordinary oil separation and microorganism treatments, the removal of organic matters is insufficient for application to a capacitive de-ionization treatment.

Of organic matters remaining in water, some are present in the form of ions and others in the form of molecules. For examples, water contains electrolytic organic matters such as acetic acid and formic acid, non-electrolytic organic matters such as phenol and benzene, and the like. In addition, water in nature contains humic acid and the like. As shown in FIG. 4(a), organic matter ions permeate through ion exchange membranes and are adsorbed to electrode surfaces when passing between the energized electrodes. In addition, organic matters in the form of molecules permeate through the ion exchange membranes by diffusion and adhere to the electrode surfaces through intermolecular forces. An electrode made mainly of carbon as mentioned above has similar characteristics to activated carbon for water treatment, and adsorbs organic matters irreversibly. That is, these organic matters are hardly released from the electrodes even when reverse voltages are applied in the step of FIG. 4(b), and mostly remain in the electrodes. The portion having organic matters adhering thereto cannot adsorb ions at the time of capacitive de-ionization, leading to a decrease in the effective area of the electrode.

In light of the above, a water treatment device according to one aspect of the present invention includes:

an activated carbon treatment section that receives an inflow of water having a total organic carbon concentration of 100 mg/l or less and adsorbs and removes organic matters contained in the water; and, on the downstream side of the activated carbon treatment section, a capacitive de-ionization treatment section including a pair of electrodes to which voltages having polarities opposite to each other are applied, a flow path that is located between the electrodes and allows the water to flow therethrough, and an ion exchange membrane that is installed on the flow path side of each of the electrodes, wherein when the water flows between the electrodes with voltages applied thereto, ions contained in the water are adsorbed to the electrodes and removed from the water, and voltages reverse to the voltages at the time of the adsorption of ions are applied to the electrodes to release the ions from the electrodes, whereby the electrodes are regenerated.

Water quality is generally controlled with biochemical oxygen demand (BOD) or chemical oxygen demand (COD). However, because the sensitivity differs depending on the kind of organic matter, BOD or COD is not necessarily proportional to the absolute value of organic matters in water. Meanwhile, in the present invention, water quality is controlled with the total organic carbon concentration (TOC). The total organic carbon concentration is an index that shows the total amount of oxidizable organic matters in water expressed as the amount of carbon, and exhibits an excellent correlation with the amount of organic matters contained in water. By using TOC as an index, the treatment can be performed according to the amount of organic matters in the water to be treated.

In actual industrial waste water, the organic matter concentration after a treatment, such as a biological treatment, varies depending on the quality of raw water. In the case of industrial waste water, it is expected that water quality may decrease to about TOC 1,500 mg/l. Like this, when water having a high concentration of organic matters is treated by an ordinary biological treatment, the resulting water quality is TOC 50 to 100 mg/l at the highest.

In the water treatment device of the present invention, an activated carbon treatment section is installed upstream of a capacitive de-ionization treatment section. Water having an organic matter content controlled to a total organic carbon concentration of 100 mg/l or less flows into the activated carbon treatment section. In the activated carbon treatment section, organic matters contained in water are adsorbed to activated carbon and thus removed from water. By the treatment in the activated carbon treatment section, regardless of the quality of water inserted into the activated carbon treatment section, the organic matter content of water after the treatment can be stably reduced to an extremely low value. Accordingly, when the water that has been treated in the activated carbon treatment section is treated in the capacitive de-ionization treatment section, the amount of organic matters adhering to electrodes can be significantly reduced, and a decrease in the ion adsorption areas of the electrodes can be suppressed. As a result, the electrode life in the capacitive de-ionization treatment section can be prolonged, and excellent demineralization treatment performance can be maintained for a long period of time.

Water taken from nature has a smaller amount of organic matters as compared with industrial waste water, but it is concerned that the performance of the capacitive de-ionization treatment section may be degraded in the long run. As mentioned above, the water treatment device of the present invention can stably reduce the amount of organic matters in water to an extremely low value. Thus, even in the case where water taken from nature is treated, high treatment performance can be maintained for a long period of time.

In the above invention, it is preferable that water having a total organic carbon concentration of 20 mg/l or less is discharged from the activated carbon treatment section. This is because, in such a case, the amount of organic matters fed to the capacitive de-ionization treatment section becomes extremely small, and the degradation of demineralization treatment performance can be even more suppressed.

In the above invention, it is preferable that the water treatment device includes, on the upstream side of the activated carbon treatment section, at least one of a biological treatment section where the organic matters in the water are decomposed and removed by microorganisms and an oxidization treatment section where the organic matters in the water are subjected to an oxidization treatment.

Particularly in the case where waste water from a plant or domestic waste water is treated, the raw water contains a large amount of organic matters. Therefore, it is preferable that the biological treatment section and the oxidization treatment section are installed upstream of the activated carbon treatment section, and pretreatments are performed to achieve a total organic carbon concentration of 100 mg/l or less.

Advantageous Effects of Invention

In the water treatment device of the present invention, an activated carbon treatment section is arranged upstream of a capacitive de-ionization treatment section, and water having a reduced total organic carbon concentration is supplied to the capacitive de-ionization treatment section. Accordingly, the amount of organic matters adhering to electrodes in the demineralization treatment section can be significantly reduced. As a result, a decrease in the ion adsorption areas of the electrodes can be suppressed, and the degradation of demineralization performance can be suppressed.

DESCRIPTION OF EMBODIMENTS

Figure 1:
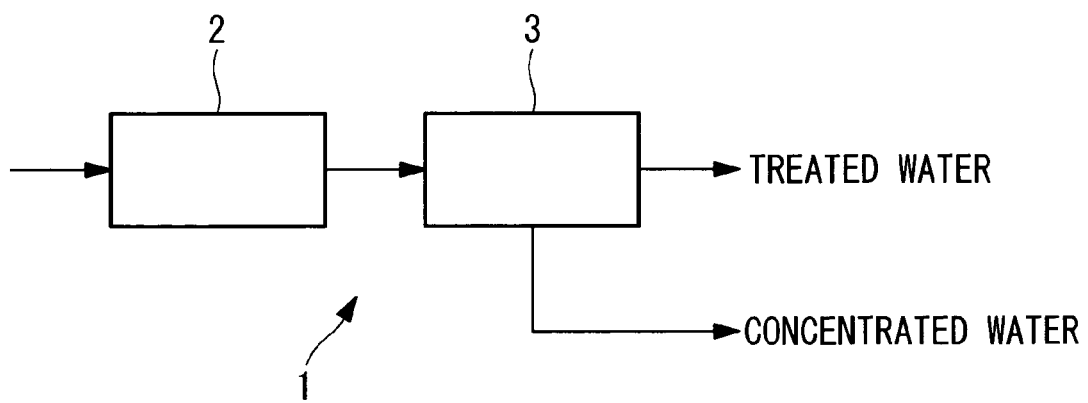
FIG. 1 is a block diagram of an example of a water treatment device.

FIG. 1 is a block diagram of an example of a water treatment device. The water treatment device 1 includes, from the upstream side, a pretreatment section 2 and a demineralization section 3. The pretreatment section 2 is a biological treatment section that decomposes organic matters by a biological treatment, an oxidization treatment section that decomposes organic matters by an oxidization treatment, or a combination thereof.

In the case where waste water from a plant or domestic waste water is treated, the pretreatment section 2 includes an oil separator that separates oils from waste water and a separation section that causes the aggregation and sedimentation of heavy metals or suspended particles. The oil separator and the separation section are installed on the upstream side of the biological treatment section. In the case where water taken from nature, such as a river, is treated, the oil separator and the separation section may be omitted.

The biological treatment section subjects organic matters in water to a decomposition treatment by microorganisms. The biological treatment section is configured as a combination of a treatment device using a membrane-separation activated sludge process (MBR: Membrane Bio-Reactor), a treatment device using a biofilm process (BFR: Bio-Film Reactor), an aeration tank, and a sedimentation tank. The biological treatment section may also be configured as a combination of MBR and BFR. In the case of configuration having a combination of an aeration tank and an sedimentation tank, in order to prevent clogging in a demineralizer in the demineralization section 3, a filtration device, such as a filter, is provided downstream of the sedimentation tank.

In the case of MBR, a membrane having pores of about 0.1 μm is immersed in water in the biological reactor. Microorganisms are present in water in the biological reactor, and the microorganisms decompose organic matters in water. The size of microorganisms useful for the sludge treatment in the biological reactor is about 0.25 μm at the minimum. Accordingly, water in the biological reactor is solid-liquid separated through the membrane into water and microorganisms, and only water is discharged from MBR.

In the case of BFR, a support having a film of microorganisms formed on the surface thereof is installed inside. When microorganisms on the support surface come into contact with water containing organic matters, the microorganisms decompose the organic matters in water.

In the case of configuration having a combination of MBR and BFR, the operation of MBR and BFR is controlled according to the amount of organic matters in water (COD). For example, in the case where COD in water is low, only MBR is operated. In the case where COD greatly varies, BFR is operated in parallel with MBR.

The oxidization treatment section removes organic matters from water by oxidation and decomposition. In the water treatment device of this embodiment, an ozone treatment, an ultraviolet treatment, a sodium hypochlorite treatment, and a hydrogen peroxide treatment are employed as oxidation treatment methods. The above treatment may be performed alone, or it is also possible to perform a plurality of treatments in combination.

The oxidization treatment section is installed on the upstream side of the activated carbon treatment section 10.

In the case of an ozone treatment, ozone generated by an ozone generator is supplied to the oxidization treatment section. Organic matters in water passing through the oxidization treatment section are oxidized and decomposed by ozone.

In the case of an ultraviolet treatment, an ultraviolet lamp is installed in the oxidization treatment section. Water passing through the oxidization treatment section is irradiated with ultraviolet light, and organic matters are oxidized and decomposed by ultraviolet light.

In the case of a sodium hypochlorite treatment, sodium hypochlorite is supplied to the oxidization treatment section. Organic matters in water passing through the oxidization treatment section are oxidized and decomposed by sodium hypochlorite.

In the case of a hydrogen peroxide treatment, hydrogen peroxide is supplied to the oxidization treatment section. Organic matters passing through the oxidization treatment section are oxidized and decomposed by hydrogen peroxide.

Figure 2:
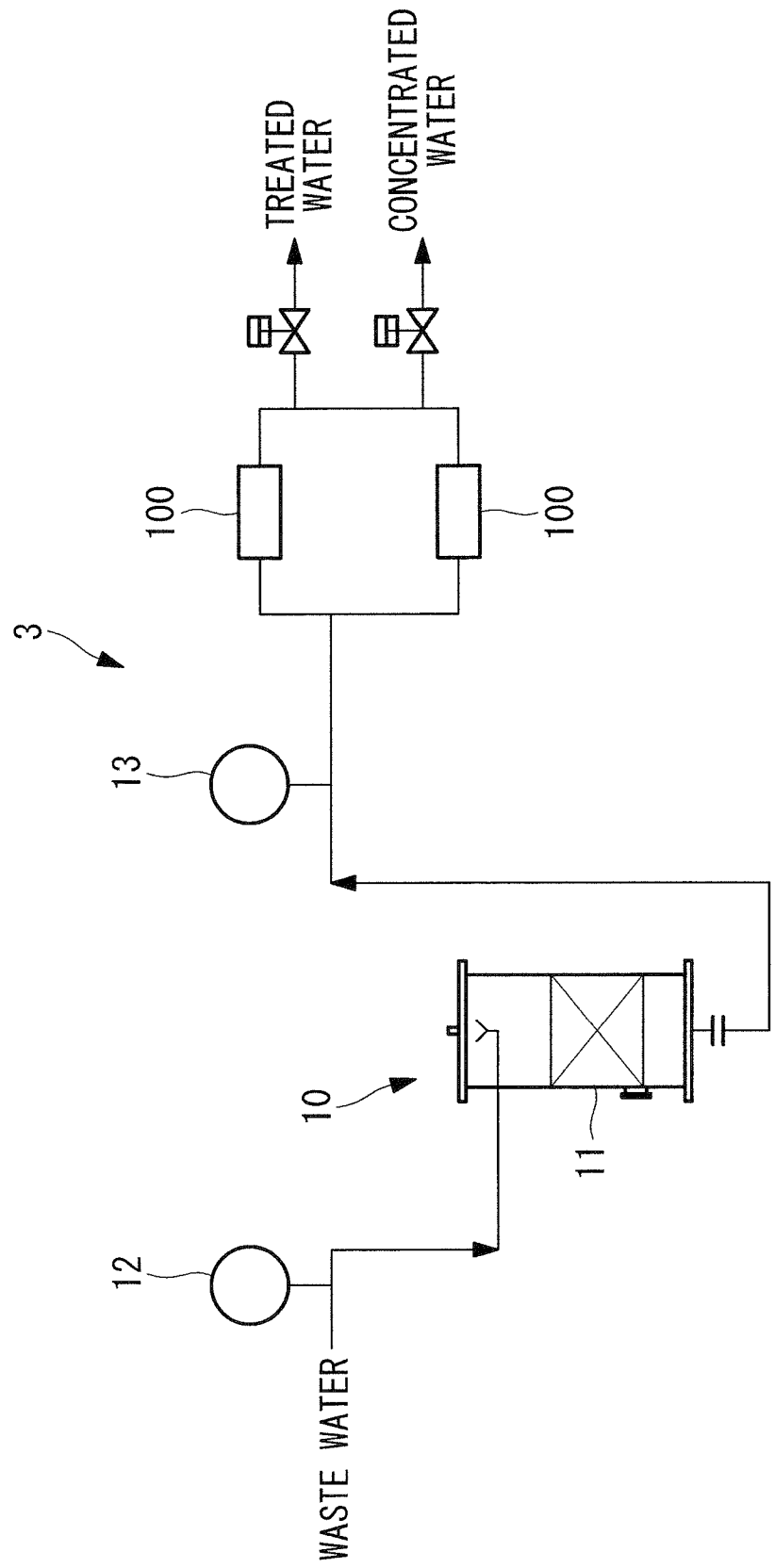
FIG. 2 is a schematic diagram explaining an example of a demineralization section of a water treatment device.

FIG. 2 is a schematic diagram explaining an embodiment of the demineralization section 3 of the water treatment device.

The demineralization section 3 includes an activated carbon treatment section 10 and a capacitive de-ionization treatment section 100. The demineralization section 3 may further have a reverse osmosis membrane demineralizer.

The activated carbon treatment section 10 houses a filled tank 11 that is filled with activated carbon inside. The activated carbon used in this embodiment is activated carbon for water treatment. Water fed from the biological treatment section is supplied into the activated carbon treatment section 10 from the top, permeates through the filled tank 11, and is discharged from the bottom of the activated carbon treatment section 10.

Figure 4:
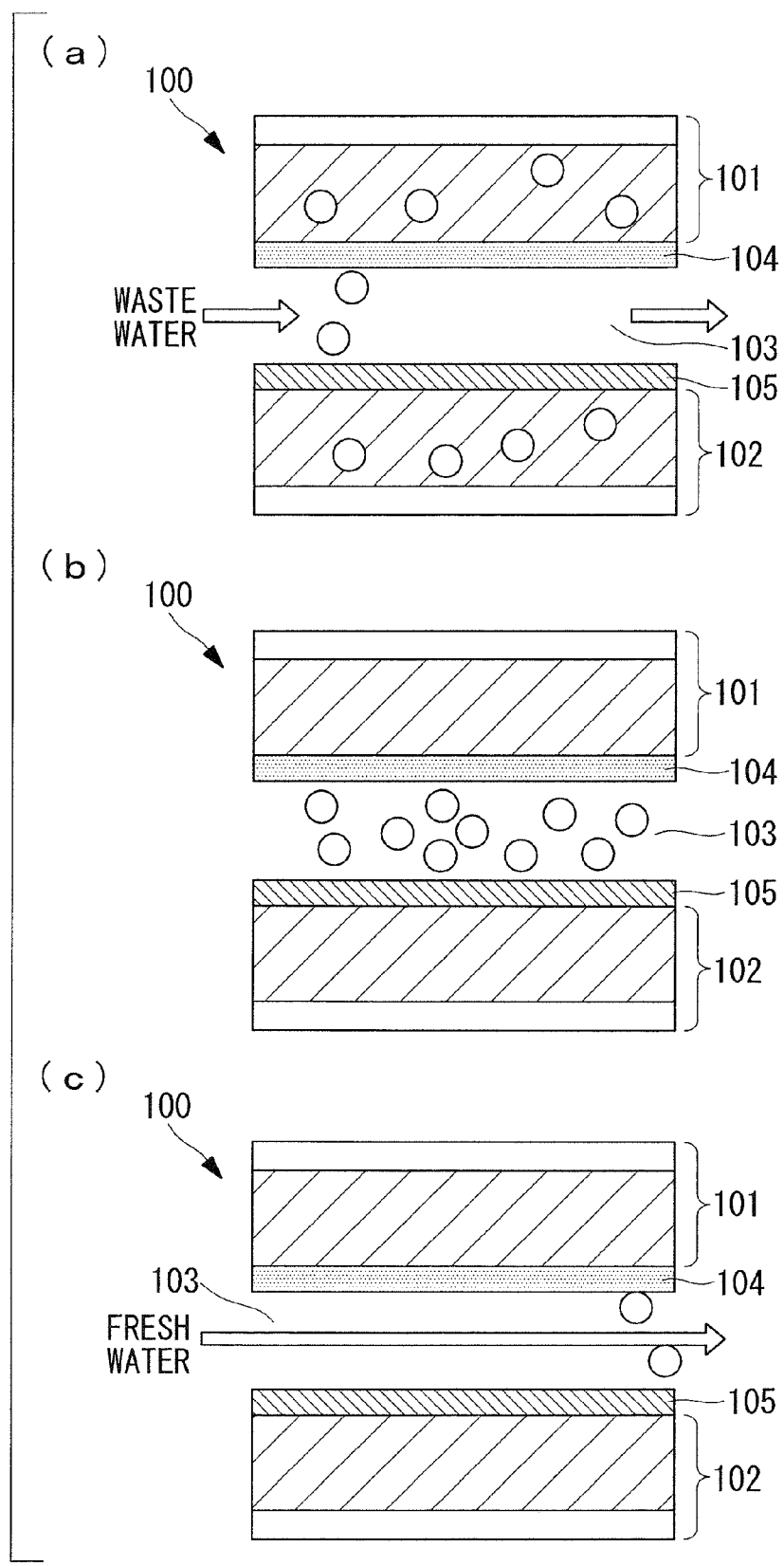
FIGS. 4(a) to 4(c) are schematic diagrams of a capacitive de-ionization treatment device.

In this embodiment, the capacitive de-ionization treatment section 100 has the same configuration as the capacitive de-ionization treatment device of FIG. 4. One or more capacitive de-ionization treatment sections 100 are installed downstream of the activated carbon treatment section 10. As shown in FIG. 2, in many cases, a plurality of capacitive de-ionization treatment sections 100 are arranged parallel to the flow of water. However, it is also possible that a plurality of capacitive de-ionization treatment sections 100 are disposed in series. Alternatively, a combination of series and parallel arrangements is also possible.

The demineralization section 3 may also have, on the upstream side of the activated carbon treatment section 10, a tank (not shown) that temporarily stores water from the biological treatment section and feeds a predetermined amount of water to the capacitive de-ionization treatment section 100.

On the upstream side of the activated carbon treatment section 10 in the demineralization section 3 and between the activated carbon treatment section 10 and the capacitive de-ionization treatment section 100, organic matter content measurement sections 12 and 13 for measuring the total organic carbon concentration (TOC) in water are installed, respectively.

The process of a water treatment using the above water treatment device will be described hereinafter. The following will describe, as an example, the case where the water treatment device includes an oil separator and a separation section and treats industrial waste water.

The pretreatment section 2 receives raw water (waste water). In the case of waste water from a plant or domestic waste water, the water contains, as organic components, oils in the form of oil droplets or an emulsion, as well as organic matters that are present in water in the form of molecules or ions (acetic acid, formic acid, phenol, etc.).

The oil separator removes oils form the raw water. The separation section adds a chelating agent to waste water to chelate heavy metals and insolubilize them. The separation section adds an aggregating agent to waste water to cause the aggregation of heavy metal chelates, suspended particles, etc., followed by sedimentation, thereby removing heavy metals and suspended particles from the waste water.

In the case of configuration having a biological treatment section, the waste water from which oils, heavy metals, and suspended particles have been removed is fed to the biological treatment section. In the biological treatment section, organic matters, such as acetic acid, formic acid, humic acid, and phenol as mentioned above, are decomposed.

In the case of configuration having an oxidization treatment section, the waste water is irradiated with ultraviolet light. Alternatively, ozone-containing water, a sodium hypochlorite solution, and a hydrogen peroxide solution are supplied into the waste water. As a result, organic matters, such as acetic acid, formic acid, humic acid, and phenol as mentioned above, are oxidized and decomposed.

The organic matter content measurement section 12 measures the TOC of waste water before the treatment in the activated carbon treatment section 10. TOC may be measured by an online meter or may also be sampled and analyzed. In this embodiment, as a result of pretreatments such as the biological treatment, water before flowing into the activated carbon treatment section 10 has a TOC of 100 mg/l or less.

The waste water having a TOC of 100 mg/l or less flows into the activated carbon treatment section 10 in the demineralization section 3. While the waste water passes through the filled tank 11 of the activated carbon treatment section 10, organic matters remaining in the waste water, such as acetic acid, formic acid, humic acid, and phenol as mentioned above, are adsorbed to the activated carbon surface and thus removed. The TOC of the water after the treatment in the activated carbon treatment section 10 is reduced to about $1/3$ to $1/5$ of the TOC before the treatment.

The organic matter content measurement section 13 measures the total organic carbon concentration of the waste water after the treatment in the activated carbon treatment section 10. In this embodiment, the TOC of water after the treatment in the activated carbon treatment section 10 is 20 mg/l or less, more preferably 10 mg/l or less.

The waste water discharged from the activated carbon treatment section 10 is fed to the capacitive de-ionization treatment section 100. In the capacitive de-ionization treatment section 100, the demineralization treatment described in FIG. 4 is performed. By the demineralization treatment, the water stored in the flow path 103 is discharged from the capacitive de-ionization treatment section 100 and recovered as a concentrated water having a high concentration of ions. The positive electrode 101 and the negative electrode 102 are regenerated to the state where no ions are adsorbed.

Figure 3:
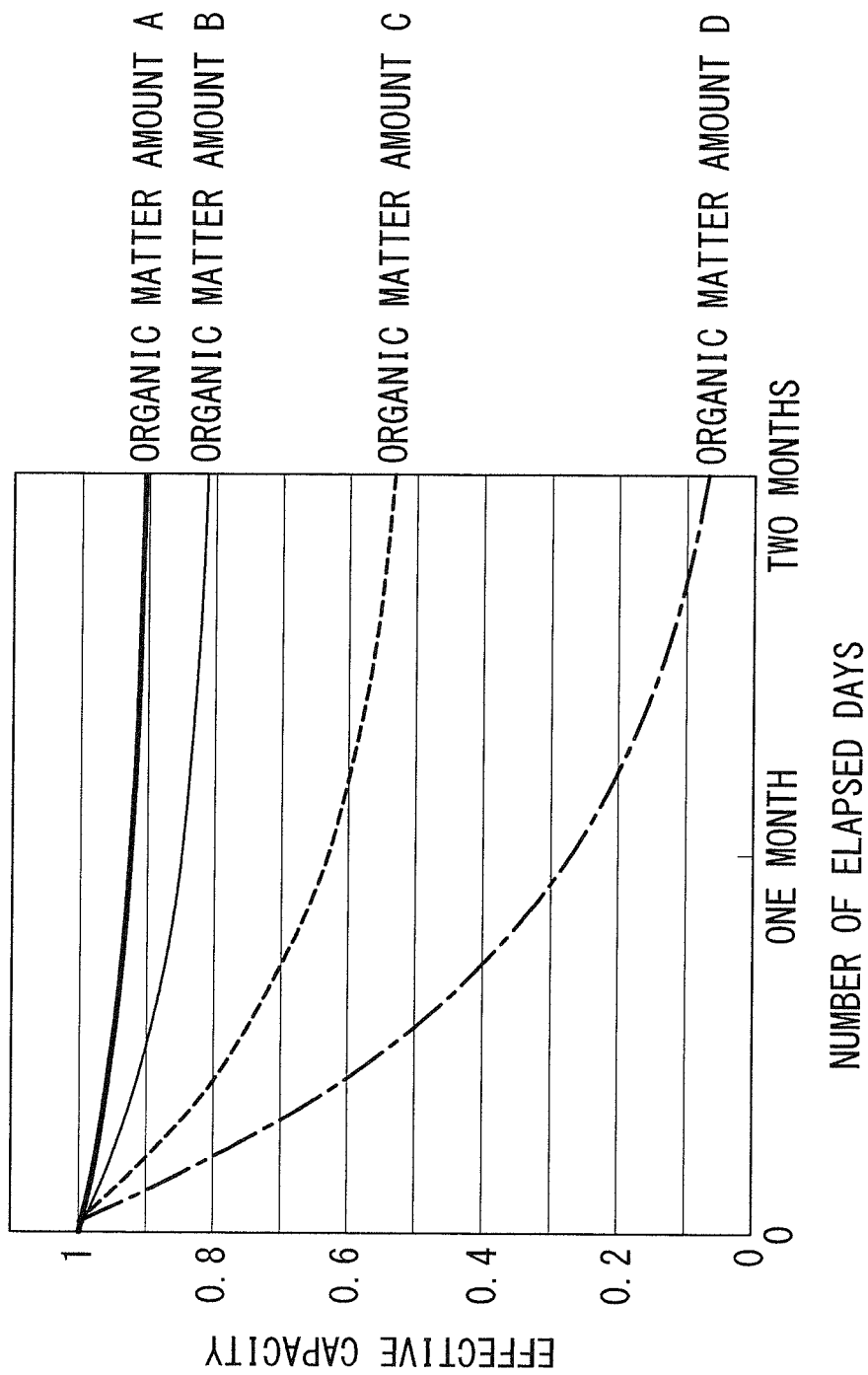
FIG. 3 is a graph showing time-dependent changes in the effective capacity of an electrode when waters having different organic matter contents are subjected to a capacitive de-ionization treatment.

FIG. 3 is a graph showing time-dependent changes in the effective capacity of an electrode when waters having different organic matter contents were subjected to capacitive de-ionization treatments under the same conditions. In the figure, the abscissa is the number of elapsed days and the ordinate is effective capacity. Effective capacity is defined by the proportion of ions that can be adsorbed to the electrode, taking the effective capacity of the electrode before use as 100%.

In FIG. 3, the organic matter amount A represents the case where the TOC of water flowing into the capacitive de-ionization treatment section is 10 mg/l, and the organic matter amount B represents the case where TOC is 20 mg/l. The organic matter amounts C and D each represent the case where TOC exceeds 20 mg/l, and TOC is higher in the organic matter amount D than in the organic matter amount C.

As shown in FIG. 3, the effective capacity rapidly decreases in the case of the organic matter amount C or D, and it can be understood that the demineralization treatment capability is reduced within a short period of time. That is, in the case where water flowing into the capacitive de-ionization treatment section contains a large amount of organic matters, short-cycle electrode maintenance, for example, is required to maintain high treatment performance, resulting in a decrease in treatment efficiency.

Meanwhile, in the case of the organic matter amount A or B, the effective capacity decreases slowly. From these results, it can be understood that when an activated carbon treatment section is provided on the upstream side of the capacitive de-ionization treatment section, and the TOC of water is reduced to 20 mg/l or less by a treatment in the activated carbon treatment section prior to performing a capacitive de-ionization treatment, a decrease in the effective ion adsorption areas of electrodes in the capacitive de-ionization treatment section is suppressed, and high water treatment capability can be maintained for a long period of time.

REFERENCE SIGNS LIST

1 Water treatment device
2 Pretreatment section

3 Demineralization section
10 Activated carbon treatment section
11 Filled tank
12, 13 Organic matter content measurement section
100 Capacitive de-ionization treatment section
101 Positive electrode
102 Negative electrode
103 Flow path
104 Anion exchange membrane
105 Cation exchange membrane

The invention claimed is:

1. A water treatment device comprising:

an activated carbon treatment section that receives an inflow of water having a total organic carbon concentration of 100 mg/l or less and adsorbs and removes organic matters contained in the water;

on a downstream side of the activated carbon treatment section, a capacitive de-ionization treatment section including a pair of electrodes to which voltages having polarities opposite to each other are applied, a flow path that is located between the electrodes and allows the water to flow therethrough, and an ion exchange membrane that is installed on a flow path side of each of the electrodes, wherein when the water flows between the electrodes with voltages applied thereto, ions contained in the water are adsorbed to the electrodes and removed from the water, and voltages reverse to the voltages at a time of adsorption of the ions are applied to the electrodes to release the ions from the electrodes, whereby the electrodes are regenerated;

organic matter content measurement sections that are installed on an upstream side of the activated carbon treatment section and between the activated carbon treatment section and the capacitive de-ionization treatment section, and that measure the total organic carbon concentration in the water; and a biological treatment section, installed on the upstream side of the activated carbon treatment section, where the organic matters in the water are decomposed and removed by microorganisms.

2. The water treatment device according to claim 1, wherein water having a total organic carbon concentration of 20 mg/l or less is discharged from the activated carbon treatment section.

3. The water treatment device according to claim 1, further comprising, on the upstream side of the activated carbon treatment section, an oxidization treatment section where the organic matters in the water are subjected to an oxidization treatment.

4. The water treatment device according to claim 2, further comprising, on the upstream side of the activated carbon treatment section, an oxidization treatment section where the organic matters in the water are subjected to an oxidization treatment.

* * * * *